United States Patent [19]

Hashimoto

[11] Patent Number: 5,022,606
[45] Date of Patent: Jun. 11, 1991

[54] CLICK SOUND GENERATOR FOR FISHING REEL

[75] Inventor: Hiroshi Hashimoto, Tokyo, Japan

[73] Assignee: Daiwa Seiko, Inc., Tokyo, Japan

[21] Appl. No.: 416,231

[22] Filed: Oct. 2, 1989

[30] Foreign Application Priority Data

Nov. 7, 1988 [JP] Japan .............................. 63-145216[U]

[51] Int. Cl.$^5$ ............................................ A01K 89/015
[52] U.S. Cl. .................................................... 242/307
[58] Field of Search ........................ 242/306, 307, 308

[56] References Cited

U.S. PATENT DOCUMENTS

| 845,805 | 3/1907 | Meisselbach | 242/308 |
| 2,263,237 | 11/1941 | Fiscus | 242/308 X |
| 2,633,308 | 3/1953 | Zientowski | 242/308 |
| 4,088,279 | 5/1978 | Karlsson et al. | 242/307 |

FOREIGN PATENT DOCUMENTS 62-57675 4/1987 Japan .

Primary Examiner—Katherine Matecki
Attorney, Agent, or Firm—Longacre & White

[57] ABSTRACT

A click sound generator for a fishing reel includes a clicking claw and a clicking toothed gear in order to generate a click sound. The clicking claw is arranged in engagement with the clicking toothed gear. The click sound generator of the present invention further includes two kinds of the springs. Two springs are arranged in contact with the clicking claw to apply two kinds of resilient forces in the opposite direction to each other. The stronger resilient force is applied to the clicking claw to generate a large click sound only when a fishing line is unwound from a spool, and the other resilient force is applied to the clicking claw to generate a small sound only when the fishing line is wound on the spool.

7 Claims, 2 Drawing Sheets

CLICK SOUND GENERATOR FOR FISHING REEL

BACKGROUND OF THE INVENTION

This invention relates to an improvement of a click sound generator for a fishing reel, and more particularly, to a click sound generator for producing two kinds of click sound for a fishing reel.

In a conventional fishing click sound generator as shown in, for example, Unexamined Japanese Utility Model Publication No. 62-57675, when a fishing line is unwound from a spool upon hitting fish, a clicking toothed gear associated with the spool is rotated in the reverse direction, so that a clicking claw which is in contact with a clicking toothed gear is pivotally swung to thereby generate a click sound. The sound enables a fisherman to perceive fish being hit. This conventional manner is well known.

In this conventional generator, as a result of using a strong spring and a weak spring, a large sound is generated when the spool is rotated in a direction in which the fishing line is unwound from the spool, whereas small sound is generated in the fishing-line winding direction in which the click sound is not needed. This causes the clicking claw and clicking toothed gear to have a higher durability.

The conventional click sound generator, however, suffers from the following problems. In the conventional type click sound generator, when the fishing line is unwound from the reel, due to the fact that biasing forces of the strong and weak springs are both applied to the clicking claw in the same direction, the clicking claw is struck on the clicking toothed gear strongly, so that the large click sound is generated from the clicking claw and the clicking toothed gear. Since both biasing forces are applied to the clicking claw in the same direction, an interference of the strong and weak springs is likely to influence the click sound generation in the fishing-line unwinding direction, so that the click sounds are likely to be changeable and to be doubled. Consequently, constant and crisp click sounds cannot be generated in the fishing-line unwinding direction.

Further, it is very difficult to assemble two springs with the clicking claw so that two springs should be assembled against the biasing forces of two springs which work in the same direction.

Furthermore, since the fishing claw is made to be engaged with and disengaged from the clicking toothed gear, a special mechanism, such as an eccentricity cam, is needed, so that a large number of mechanical parts are required and hence, the mechanism of the click sound generator is expensive.

SUMMARY OF THE INVENTION

It is an object of the present invention to provide a click sound generator for a fishing reel, which overcomes the above-mentioned problems.

Another object of the present invention is to provide a click sound generator which provides a click sound generator which is simple in construction of mechanical parts and which generates comfortable click sound.

According to the present invention, the above-noted and other objects are attained by a click sound generator for a fishing reel having a clicking toothed gear being rotatable together with a spool, a clicking claw arranged in engagement with the clicking toothed gear, a leaf spring being in contact with one side of the clicking claw so that a strong resilient force of the spring is applied to the clicking claw when a spool is rotated in the fishing-line unwinding direction, and a spring being contact with the other side of the clicking claw so that a weak resilient force of the spring is applied to the clicking claw in the opposite direction of the strong force when a spool is rotated in another direction, that is, in the fishing-line winding direction.

BRIEF DESCRIPTION OF THE DRAWINGS

The manner by which the above objects, and other objects, features, and advantages of the present invention are attained will become fully apparent from the following detailed description when it is considered in view of the drawings, wherein.

DETAILED DESCRIPTION OF THE PREFERRED EMBODIMENTS

The present invention will now be described in detail with reference to the accompanying drawings.

Figure 1:
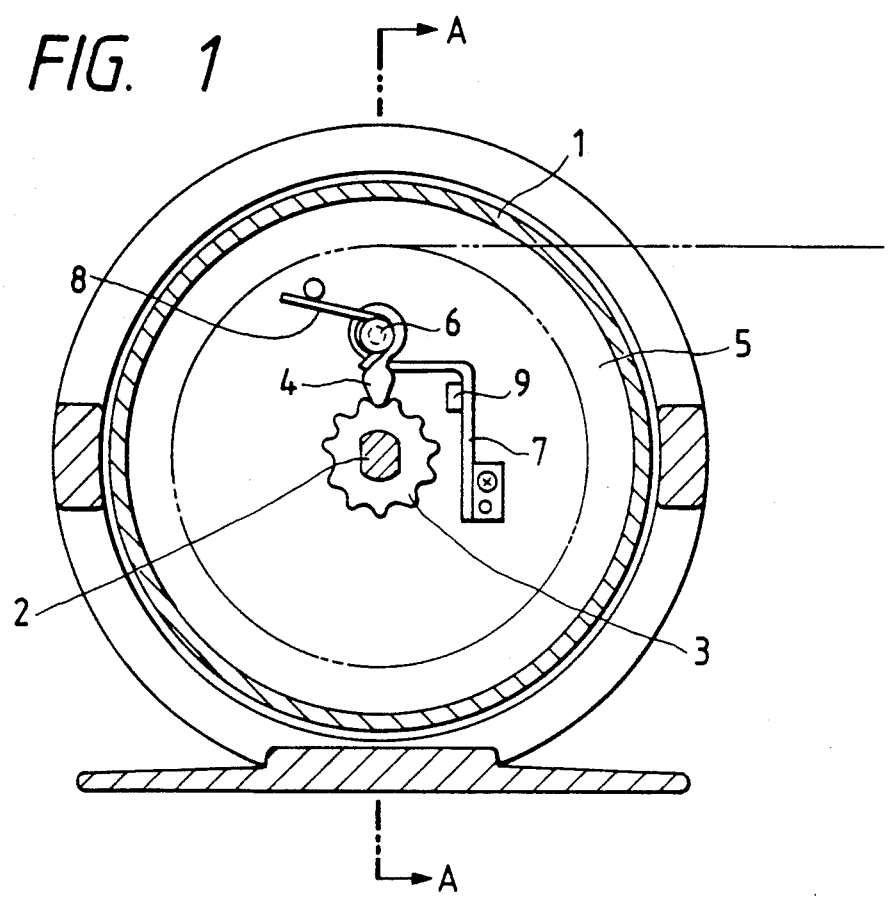
FIG. 1 is a vertical sectional view of a click sound generator of an embodiment of the present invention.
Figure 2:
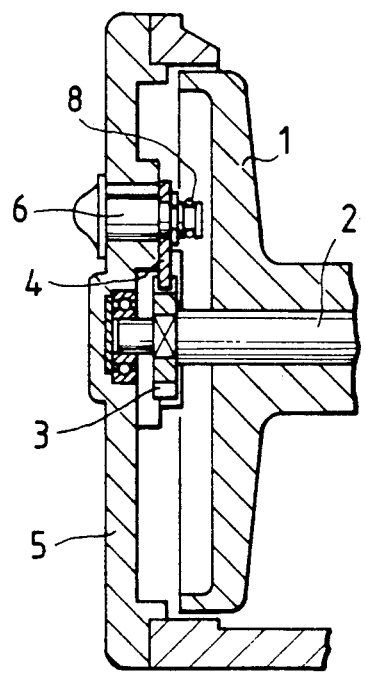
FIG. 2 is a sectional view taken along the line of FIG. 1.

In FIGS. 1 and 2, there is a fishing reel having a spool shaft 2 secured to a spool 1. A toothed clicking gear 3 is secured to the spool shaft 2 to rotate together with spool 1. A clicking claw 4 is arranged in engagement with the clicking toothed gear 3 and is pivotally mounted on a support shaft 6 which is supported to a side plate 5 to be movable up and down. Accordingly, the clicking claw 4 may selectively engage with and disengage from the clicking toothed gear 3.

A leaf spring 7 fixed to the side plate 5 is in contact with one side of the clicking claw 4, so that a strong resilient force of the leaf spring 7 is applied to the clicking claw 4 to generate a large click sound upon the reverse rotation of the spool, that is, when the spool is rotated in a direction in which the fishing line is unwound from the spool.

A torsion spring 8 is arranged in contact with the other side of the clicking claw 4, so that a weak resilient force of the torsion spring 8 is applied to the clicking claw 4 to generate a small click sound during the forward rotation of the spool, that is, when a spool is rotated in a fishing-line winding direction.

Figure 4:
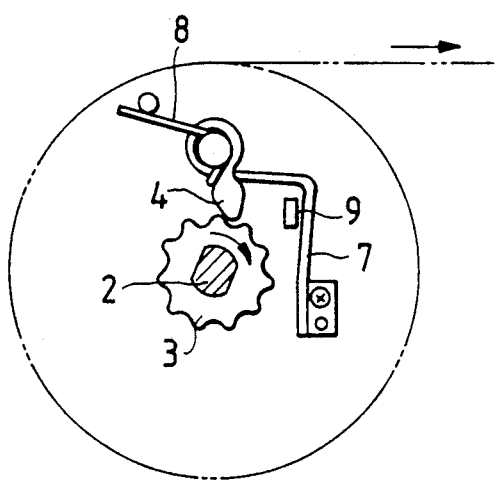
FIG. 4 is a front view showing the major parts of the embodiment in FIG. 1 in the unwinding rotation of the spool.
Figure 5:
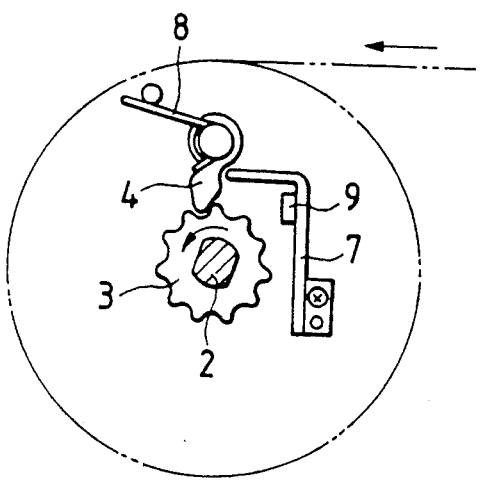
FIG. 5 is a front view showing the major parts of the embodiment in FIG. 1 in the winding rotation of the spool.

Accordingly, the large click sound can be generated from the clicking claw 4 and clicking toothed gear 3 by the action of the strong resilient force of the leaf spring 7 when the clicking toothed gear 3 is rotated clockwise as shown in FIG. 4, that is, when the fishing line is unwound from the spool 1. The small click sound can be generated by the action of the weak resilient force of the torsion spring 8 when the clicking toothed gear 3 is rotated counterclockwise as shown in FIG. 5, that is, when the fishing line is wound on the spool 1.

Figure 3:
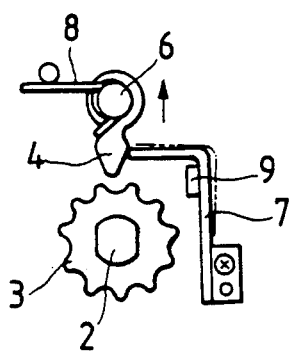
FIG. 3 is a front view showing the major parts of the embodiment in FIG. 1 when the clicking claw is disengaged from the clicking toothed gear.

Further, as best shown in FIG. 3, if the support shaft 6 is moved upwardly to disengage the clicking claw 4 from the clicking toothed gear 3, it is possible to rotate the clicking toothed gear 3 in either the forward or the reverse direction.

Figure 6:
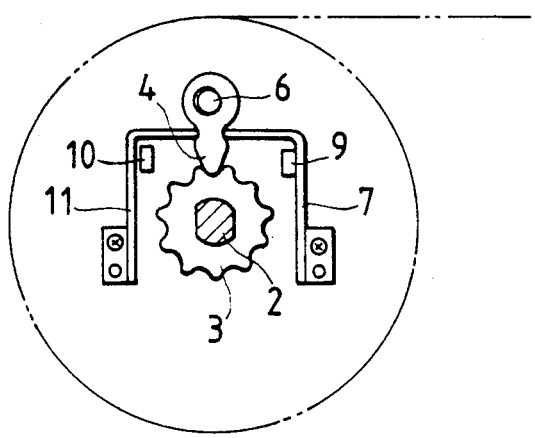
FIG. 6 is a front view showing major parts of another embodiment of the present invention.

FIG. 6 shows a click sound generator in accordance with another embodiment of the present invention, in which another leaf spring 11 is used in place of the weaker spring 8, and in which the leaf spring is in contact with the clicking claw 4 at an opposite side of the strong leaf spring 7.

Figure 7:
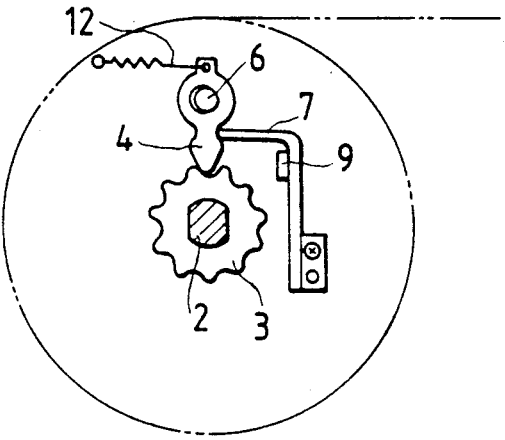
FIG. 7 is a front view showing major parts of still another embodiment of the present invention.

FIG. 7 shows still another embodiment of the present invention, in which a tension coiled spring 12 is used in place of the weaker spring 8. In addition, the stop 9 as shown in FIGS. 1, 3-5 and 7, or stops 9 and 10 as shown in FIG. 6, are provided in order to keep the clicking claw 4 in a neutral position in which it is unbiased by the leaf spring.

In the click sound generator in accordance with the present invention, the stronger leaf spring and the weaker spring which individually act on the clicking claw in the opposite directions to each other are arranged in engagement with the clicking claw in order to generate the large click sound by the action of the strong resilient force of the leaf spring when the fishing line is unwound from the spool, so that the comfortable large click sound is generated, and the sound enables a fisherman to perceive fish being hit. Further, since the resilient forces of the springs is applied to the clicking claw in the opposite direction, it is easy to assemble mechanical parts into the click sound generator. Furthermore, in order to make the clicking claw engaged with and disengaged from the clicking toothed gear, a special mechanism is not needed, so that the click sound generator dispenses with a necessity of a large number of mechanical parts, to reduce the manufacture cost.

The click sound generator of the present invention has the above-mentioned features and advantages.

The invention may be embodied in other specific forms without departing from the spirit or essential characteristics thereof.

What is claimed is:

1. A click sound generator for a fishing reel comprising:

a spool rotably mounted on a side plate, said spool being for winding a fishing line thereon;
   a clicking toothed gear secured to said spool and rotated with said spool;
   a clicking claw arranged in engagement with said clicking toothed gear to generate a click sound;
   first spring means mounted on said side plate and comprising a leaf spring for applying a first resilient biasing force to said clicking claw only when said fishing line is unwound from said spool, and stop means spaced from the spring mounting and arranged at one side of said clicking claw for defining a neutral position of said clicking claw in which said clicking claw is unbiased by said leaf spring, wherein movement of said leaf spring in a direction of movement of said resilient biasing force is restricted by said stop means when said stop means comes into contact with said leaf spring; and
   second spring means for applying a second resilient force, weaker than said first resilient force, to said clicking claw only when said fishing line is wound on said spool, said second spring means being arranged at the other side of said clicking claw.

2. A click sound generator according to claim 1, wherein said second spring means comprises a torsion spring.

3. A click sound generator according to claim 1, wherein said second spring means comprises a leaf spring.

4. A click sound generator according to claim 1, wherein said second spring means comprises a tension coiled spring, said tension coiled spring being connected to said clicking claw.

5. A click sound generator according to claim 1, further comprising;
   support means for supporting said clicking claw, said support means being movable up and down so as to make said clicking claw engage with and disengage from said clicking toothed gear.

6. A click sound generator according to claim 1, wherein said stop means includes a projection provided in a side frame of the fishing reel.

7. A click sound generator according to claim 1, wherein said clicking claw is kept in said neutral position in such a manner that said clicking claw abuts a free end of said leaf spring the movement of which is restricted by said stop means.

* * * * *